C. O. BERGMAN.
THREAD MILLING MACHINE.
APPLICATION FILED MAR. 12, 1912.

1,126,688.

Patented Feb. 2, 1915.
7 SHEETS—SHEET 1.

Fig. 1.

Witnesses:
John Enders
Henry A. Parks

Inventor:
Carl O. Bergman,
by Sheridan, Wilkinson, Scott & Richmond.
Attys.

C. O. BERGMAN.
THREAD-MILLING MACHINE.
APPLICATION FILED MAR. 12, 1912.

1,126,688.

Patented Feb. 2, 1915.
7 SHEETS—SHEET 3.

Fig. 3.

Witnesses:
John Enders

Inventor:
Carl O. Bergman,
by Sheridan, Wilkinson, Scott & Richmond,
Attys.

UNITED STATES PATENT OFFICE.

CARL OTTO BERGMAN, OF EVANSTON, ILLINOIS, ASSIGNOR TO CLAYTON MARK, OF EVANSTON, ILLINOIS.

THREAD-MILLING MACHINE.

1,126,688.  Specification of Letters Patent.  Patented Feb. 2, 1915.

Application filed March 12, 1912. Serial No. 683,230.

*To all whom it may concern:*

Be it known that I, CARL OTTO BERGMAN, a citizen of the United States, residing at Evanston, in the county of Cook and State of Illinois, have invented certain new and useful Improvements in Thread-Milling Machines, of which the following is a specification.

This invention relates to improvements in thread milling machines.

An object of this invention is to provide a machine which will quickly and economically cut threads in pipe or other material. It has been found that in the ordinary process of cutting threads the latter are formed roughly and in order to cut threads rapidly and turn out threaded matter as quickly as possible much material is spoiled in the application of the old method. By the use of special milling cutters, however, applicant has found that threads may be cut on pipe or other material more rapidly than by the use of dies and such threads are smoother as well as stronger and better in every way than the threads cut by dies.

Another object of this machine is to mill internal threads in pipe or pipe coupling.

Another object is to mill either internal or external threads on both ends of pipe or other material simultaneously.

Still other objects will appear in the following specification and in the appended drawings, in which—

Figure 6:
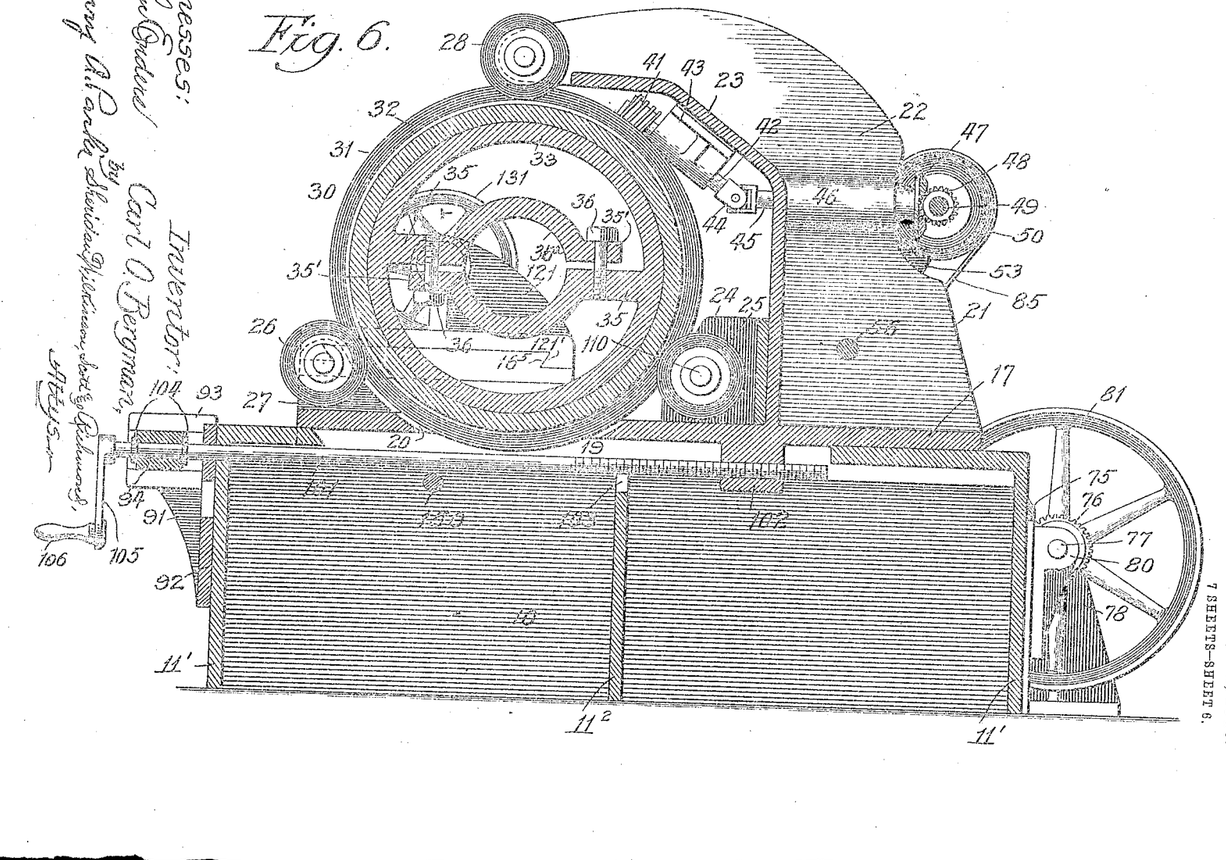
Fig. 6 is a transverse section along the line 6, 6 of Fig. 1.

Like numerals refer to like elements throughout the drawings, in which 10 designates a base member having the side walls 11 and the end walls 11′. An integral central wall 11² is located between the end walls 11′ and extends between the side walls 11, as shown in Fig. 6 of the drawings. The base member 10 is constructed with an upper approximately plane surface 12 provided at its central portion with the rib 13 having the undercut grooves 14. Secured to the side walls 11 of the base member 10 adjacent the front thereof are a pair of bracket members 15 and 16. The bracket members 15, 16 are each composed of side walls 15′, 16′, respectively, and the inner walls 15², 16², respectively, by which they are secured to the side walls 11 of the supporting base.

Figure 2:
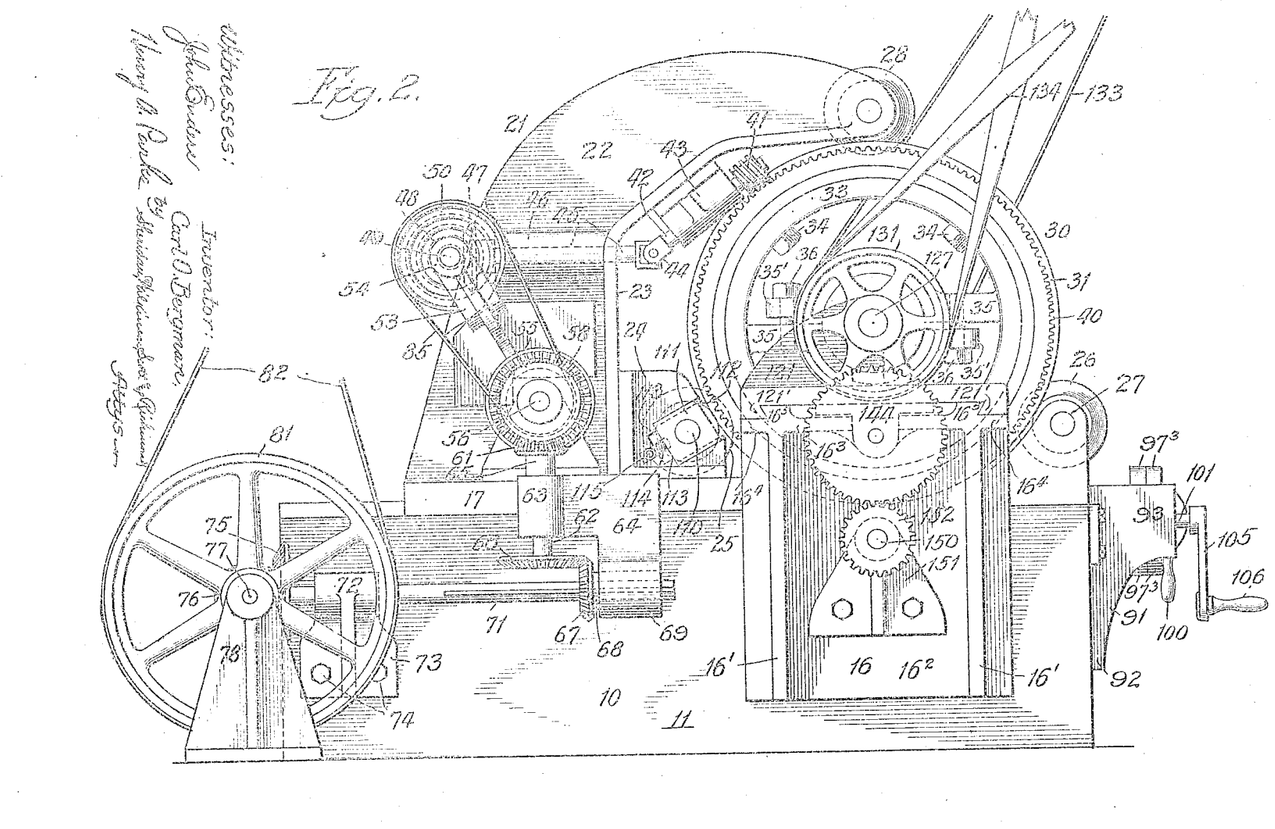
Fig. 2 is a side elevation.
Figure 7:
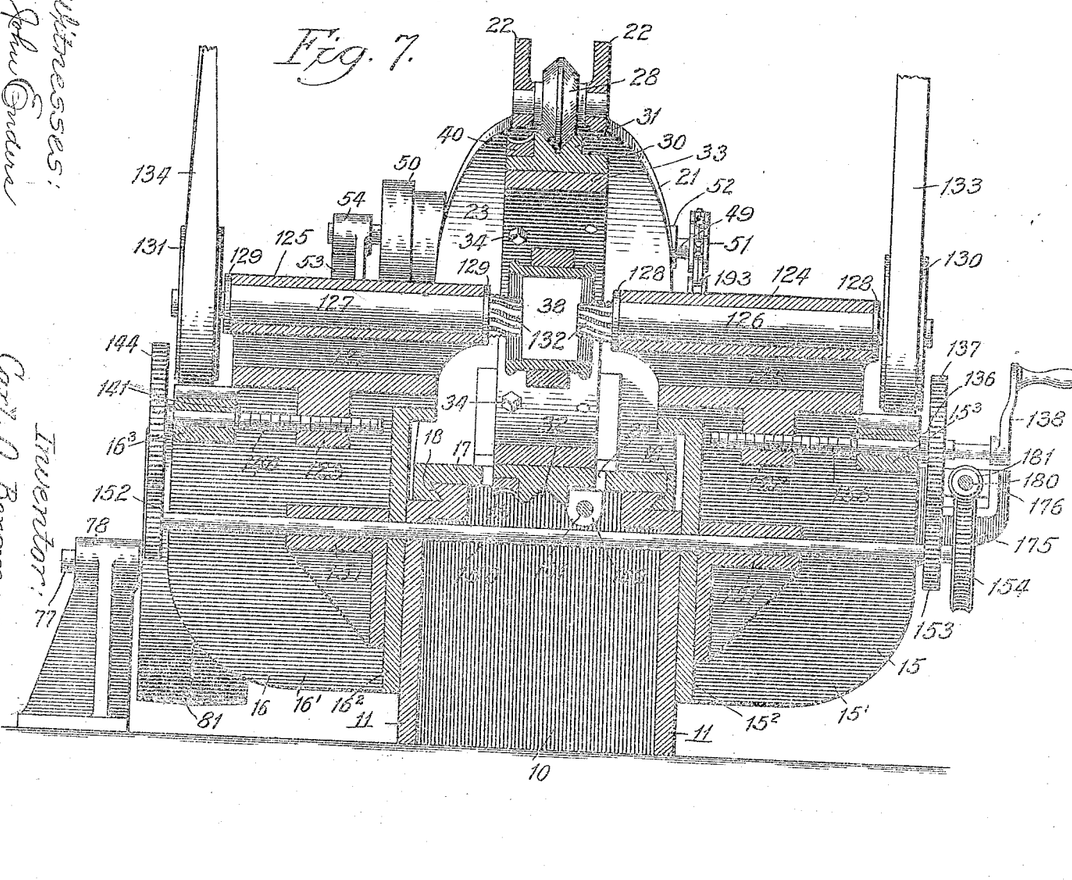
Fig. 7 is a transverse section along the line 7, 7 of Fig. 1.

A transverse rib 16³ extends across between the side walls 16′ slightly below the upper portion thereof and at their outer edges. As shown in Fig. 7 of the drawings, a similarly located rib 15³ extends between the walls 15′ of the bracket 15. The walls 15′ and 16′ of the brackets 15 and 16, respectively, are provided at their upper portions with the outwardly projecting flanges 15⁴, 16⁴ and the upwardly projecting flanges 15⁵, 16⁵, respectively. Each adjacent pair of flanges 15⁴, 15⁵, 16⁴, 16⁵ are undercut, as shown in Fig. 2 of the drawings, for example, to form a slide-way for a purpose hereinafter described.

A table member 17 is carried by the upper surface of the base 10 and is provided with undercut shoulders 18 engaging the grooves 14 of the rib 13 to permit lateral motion of the said table member. The rib 13 of the table is centrally apertured at 19, as shown in Figs. 6 and 7 of the drawings. The central portion of the table 17 is apertured also at 20, for a purpose to be hereinafter described.

Figure 1:
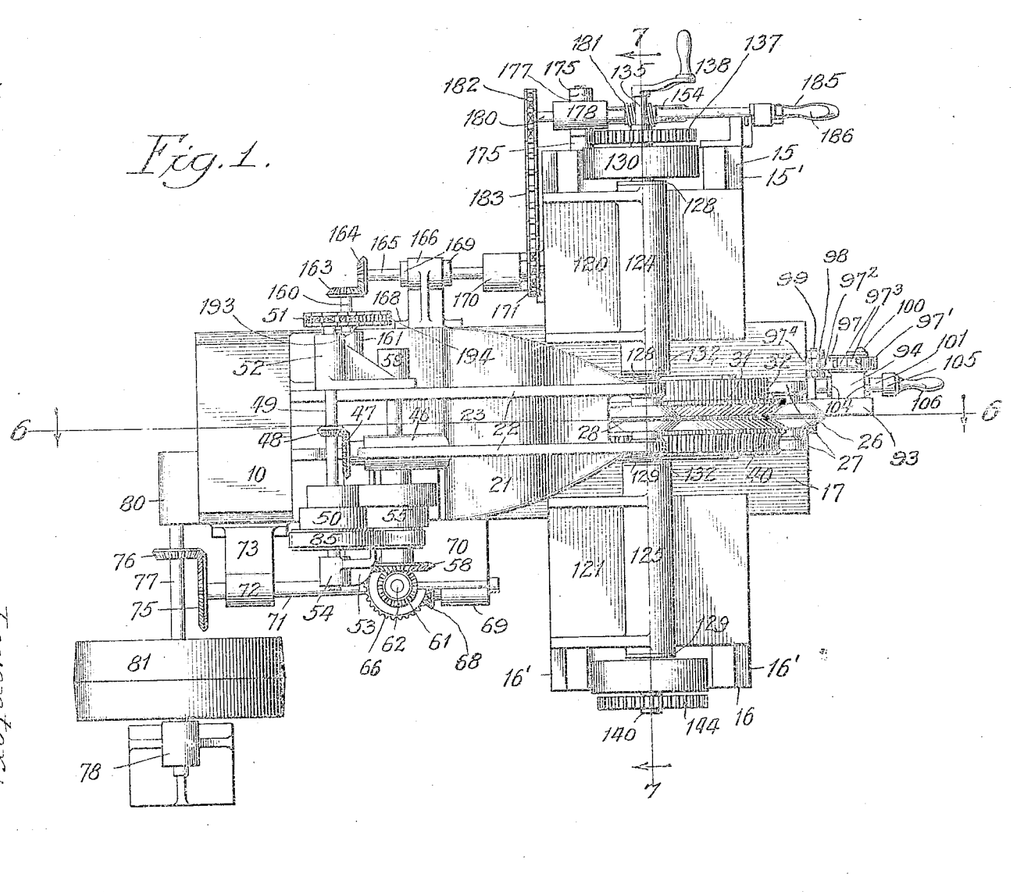
Figure 1 is a plan view of my machine.

The table member 17 is provided with an upwardly extending inverted J-shaped member 21 having its extremity overhanging the central portion of the table. This J-shaped member is preferably formed with a pair of side walls or flanges 22 rearwardly extending from the front wall 23 and being integral with the main body of the table 17. A pair of flanges 24 extend upwardly a short distance from the table 17 adjacent the front wall of the inverted J-shaped member. Journaled in these flanges is a roller 25. At the forward portion of the table 17 a second roller 26 is journaled in a pair of flanges 27 projecting upwardly. From the table 17 of the overhanging extremity of the inverted J-shaped member a third roller 28 is journaled between the flanges 22. This roller lies in the same plane with the rollers 25 and 26, the three rollers lying at approximately the apices of a quadrilateral triangle. These rollers are preferably formed with wedge shaped peripheries, as shown in Fig. 1 of the drawings. A carrying member 30 approximately cylindrical in shape is located between the rollers 25, 26 and 27 and is rotatably supported thereby. The carrying member 30 is provided at its outer periphery with a centrally located upwardly projecting rig 31 provided with a groove 32 in which the wedge shaped peripheries of the rollers are adapted to register, as shown in Fig. 7 of the drawings. By using rollers of this configuration fitting in this groove the lateral motion of the carrying member 30 with respect to the rollers is prevented, as will be apparent from the drawings. Furthermore, these rollers serve to prevent any motion of the carrying member proper save rotation upon its axis.

Secured to the inner surface of the carrying member 30 and closely fitting thereto is the sleeve 33 secured thereto by screw bolts 34 or other means. This sleeve 33 is provided with a pair of clamping members 35 extending from diametrically opposite points of its internal periphery. These members 35 overlap and are hollowed out at 35$^a$ to the configuration of pipe or other material to be clamped therebetween. Each of said members 35 terminates in a flange 35' overhanging the body portion of the other clamping member. Each of these flanges 35' threadedly engages the adjacent portion of the other flange. By tightening these bolt members 36 the material carried between said clamping member 35 will be securely held in position, as indicated in Fig. 7 of the drawings. In the embodiment shown I have formed these clamping members of a configuration to clamp pipe or pipe couplings 38, as shown in Fig. 7, but it is obvious that this interior configuration may be changed to clamp any material on which threads are to be cut.

A worm rack 40 is secured to the outer periphery of the carrying member 30 adjacent one side of the rib 31. This worm rack is securely held in place by the threaded bolt member 34, as shown in Fig. 7 of the drawings. A worm 41 engages this rack 40, as shown in Fig. 2 of the drawings. This worm 41 is carried on a shaft 42 journaled in a bearing member 43 secured to the inner face of the wall 23 of the inverted J-shaped member, as shown in Fig. 6. This shaft 42 is connected by means of a universal joint 44 to a shaft 45 carried in a bearing 46 shown as formed integral with one wall 22 of the inverted J-shaped member. This shaft 45 at its other extremity carries a beveled gear wheel 47 engaged and driven by the bevel gear 48 carried on a jack shaft 49 intermediate its extremities. Upon one end of this shaft 49 is secured a step pulley 50. Upon the other end of the shaft 49 is carried a sprocket wheel 51.

Figure 5:
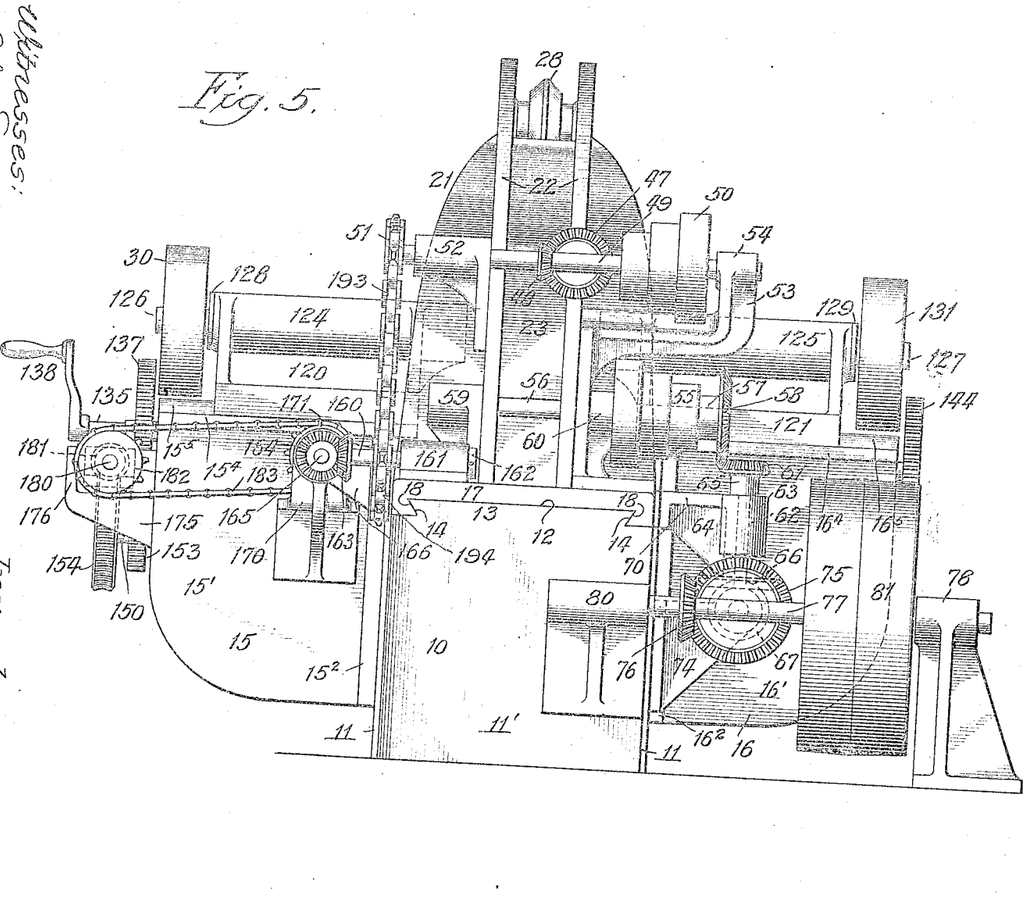
Fig. 5 is a rear elevation.

A bracket bearing 52 is secured to the outer side of one of the walls 22 of the U-shaped member, as indicated in Fig. 1 of the drawings. This shaft 49 is journaled in this bearing 52 just inside the sprocket 51. An angular bracket bearing 53 projects from the outer side of the other wall 22 of the J-shaped member and carries a bearing 54 at its upper extremity in which is journaled the other end of the shaft 49, as shown in Fig. 5 of the drawings. A second step pulley 55 having its steps arranged in opposite relation to those of the pulley 50, as shown in Fig. 5, is located therebelow. This step pulley is carried by a shaft 56 parallel to the shaft 49. Secured to the outer face of the step pulley by a collar 57 is a bevel gear 58, as shown in Fig. 5. The shaft 56 is journaled at one extremity in the bracket bearing 59 secured to the outside of one wall 22 in the J-shaped member. This shaft 56 is further journaled in the bearing 60 secured to the outer side of the other wall 22 on the J-shaped member, as shown in Fig. 5.

Meshing with the bevel gear 58 is the driving bevel gear 61 carried by the shaft 62 which is journaled in the bearing 63 carried by the bracket 64. A spacing collar 65 spaces the beveled gear 61 from the bearing member 63, as shown in Fig. 2 of the drawings. A second bevel gear 66 is carried at the other extremity of the shaft 62 and meshes with the bevel gear 67 which has a collar 68 projecting rearwardly therefrom and journaled in the bearings 69. These bearings 63 and 69 are carried on an integral bracket member 70 projecting from and secured to the table member 17 at the rearward portion thereof. The bevel gear 67 is secured to the shaft 71 by sliding a key or other equivalent means and allowing the gear 67 to slide on the said shaft 71, but not to rotate thereon. This shaft 71 projects through the collar 68 at one end and is journaled in a projection through the bearing member 72 carried by a bracket 73 secured by a rivet 74 or other means to the outside of the walls 11 of the base member 10.

Secured to the end of the shaft 71 exteriorly of the bearing member 72 is a bevel gear 75 meshing with a bevel gear 76 carried by the shaft 77. This shaft 77 is journaled at one end in an upright bearing 78 secured to the foundation or floor upon which the machine is secured, and at the other end in the bracket bearing 80 secured to and projecting from the rear wall 11' of the base 10. Carried by this shaft 77 is the driving pulley 81 adapted to be driven by a belt 82 leading from the main driving means. A short belt 85 is used to drive the step pulley 50 from the pulley 55. The steps of the pulley 50, as mentioned above, are arranged in reverse order from the steps of the pulley 55 so that the speed of the driven pulley 50 and hence the speed of the worm 41 and carrying member 30 may be varied at will as is obvious.

Figure 3:
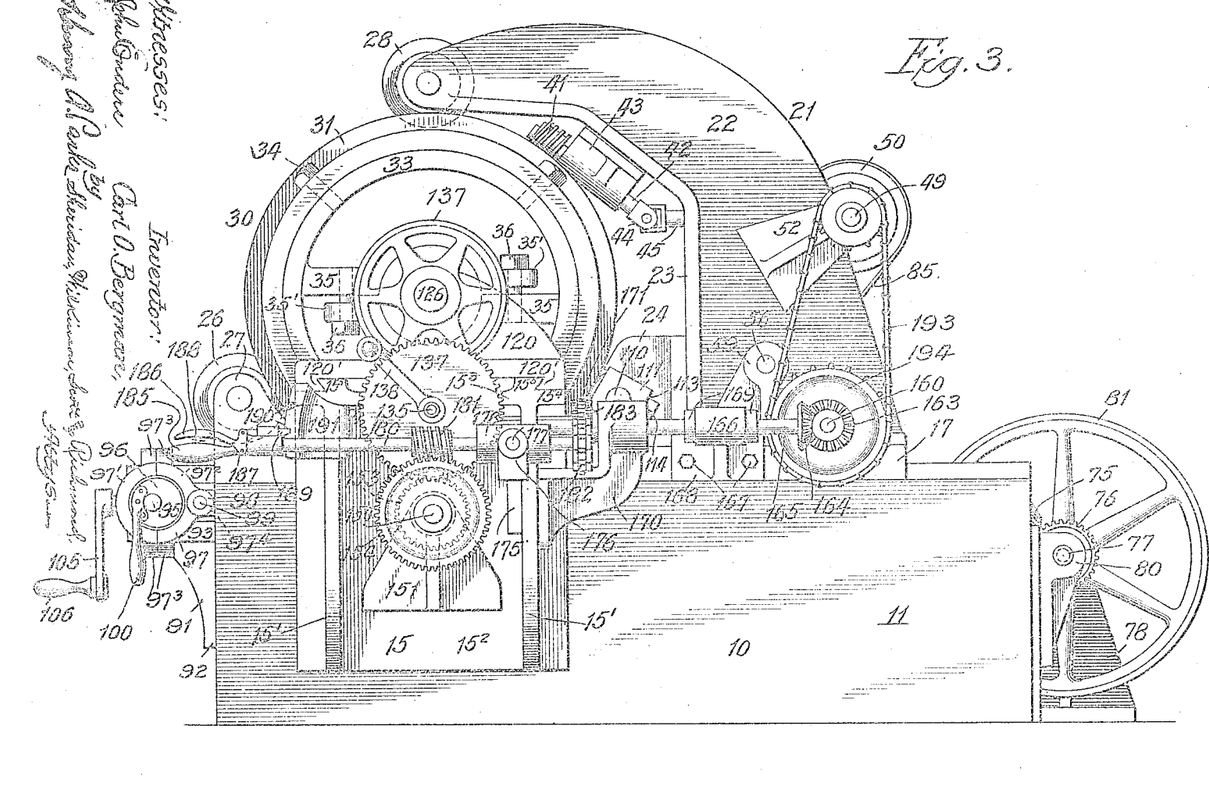
Fig. 3 is a side elevation looking at the opposite side from that shown in Fig. 2.
Figure 4:
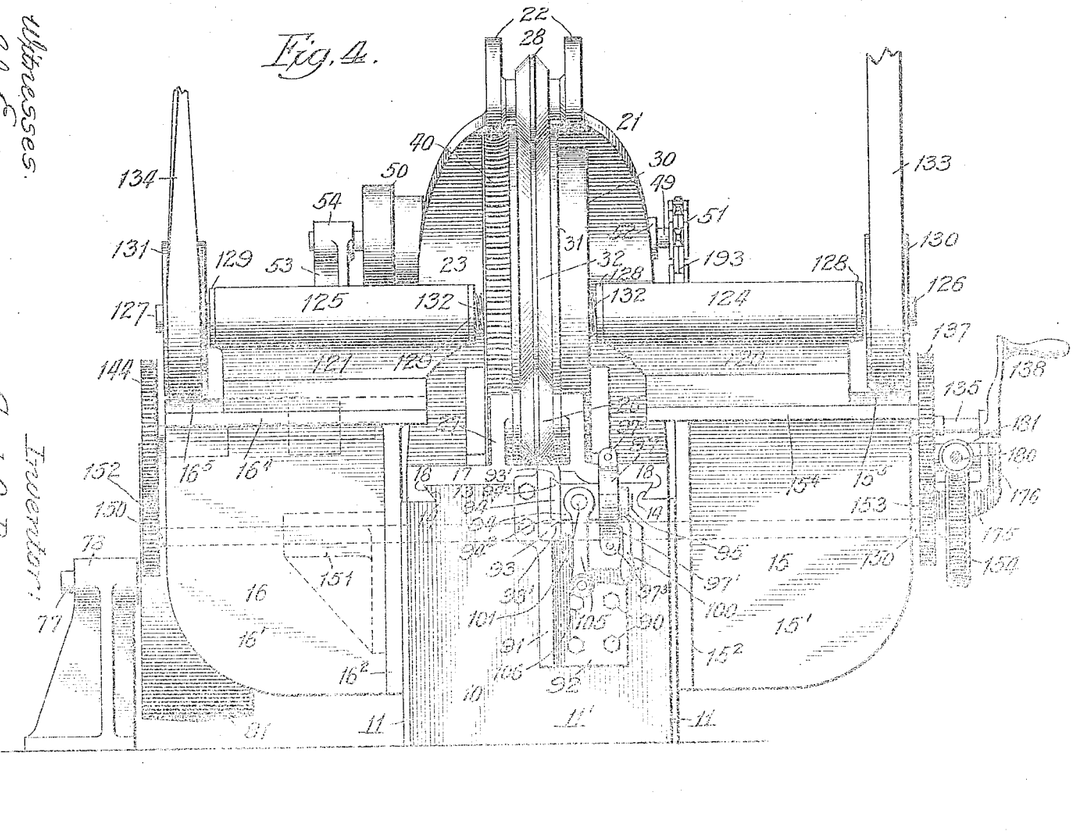
Fig. 4 is a front elevation.

Secured by bolts 90 or other means is a bracket 91 having a rear face 92 in contact with the front of the front wall 11' and secured thereto. Outwardly projecting from said rear face 92 is the guide flange 93 having undercut shoulders 93' formed thereon, as shown in Fig. 4 of the drawings. A block 94 having a rear portion 94' is provided with outwardly projecting shoulders 94² adapted to slide in the grooves below the undercut shoulders 93' of the guide flange 93. This block 94 is provided at its front face with a stud 95, as shown in Figs. 3 and 4 of the drawings. This stud is carried in an eccentric strap 97, as shown in Fig. 3 of the drawings. This strap comprises the two portions 97' and 97² having clamping lugs 97³ by which the members 97' and 97² may be clamped together. The member 97² is provided with a rearwardly projecting lug 97⁴ carried between a pair of projecting flanges 98 projecting from the front wall 11' of the base 10. A pivot pin 99 passes through apertures in the flanges 98 and the lug 97⁴ furnishing a pivotal mounting for the eccentric strap 97. (See Figs. 1 and 3.)

Secured to the outer face of the eccentric 96 is the operating handle 100. A long feed rod 101 is journaled in the block 94, the rear wall 92 of the bracket 91 and the front wall 11' of the base 10, as shown in Fig. 6 of the drawings. This rod is threaded along its rearward portion and engages the threaded aperture in the boss 102 depending from the bottom of the table 17. The central wall 11² of the base 10 is recessed at 103 on its upper portion to permit passage thereover of the boss 102. This boss is located in the aperture 19 of the base 10. Collars 104 are secured to said rod 101 on either side of the block 94, as shown in Fig. 6.

An operating lever 105 is secured at one extremity to the end of the rod 101 and has a handle 106 projecting from its other extremity. It will be seen that rotation of the lever 105 by means of the handle 106 will rotate the rod 101 which by means of its threaded engagement with the boss 102 will tend to move the table either forward or back, the lateral movement of the rod 101 being prevented by collars 104. The block 94 will not slide in its guide ways or by the undercut shoulders 93' normally owing to the engagement of the stud 95 by the eccentric 96. The eccentric 96, however, may be rotated by means of the handle 100. The rotation of this eccentric 96 by means of the handle 100 will operate to slide the block 94 forward or back accordingly as the handle is raised or lowered. The pivotal connection of the eccentric strap 97 will prevent bodily forward movement of the eccentric 96, but will allow the same to rotate. Thus it will be seen upon rotation of the eccentric the stud 95 and the block 94 will be shifted forward a distance equal to twice the eccentricity of the member 96, the undercut shoulders 93' of the guide flange 93 preventing any but forward or back movement of the block 94. The purpose of this device will be hereinafter described. It is to be noted that the roller 25 is capable of adjustment radially with respect to the carrying member 30 so as to make allowance for any wear in the rollers or the groove in which they register. This is accomplished by mounting the axle 110 on which the roller 25 is carried in the sliding blocks 111. These blocks have grooves registering with the sides of the openings 112 in the side flanges 24. This opening 112 is decreased at its rearward portion, the shoulders 113 limiting the rearward movement of the blocks 111. A stud 114 contacting with the rearward portion of the blocks 111 and threadably engaging the flanges 24 adjacent the rear of the opening 112 may be rotated to advance or retract the blocks 111. Set screws 115 may be utilized to hold the stud 114 when not desirable to rotate the same.

Pedestals 120, 121 rest on the upper portions of the brackets 15 and 16. These pedestals are provided with undercut shoulders 120', 121', respectively, at their base slidably engaging the undercut shoulders 15⁵, 16⁵, respectively, as shown in Figs. 2 and 3. Bosses 122, 123 depend from the lower portion of the pedestals 120, 121, respectively. These pedestals 120 and 121 are formed with long bearing members 124, 125, respectively, in which are journaled the spindles 126, 127, as shown in Fig. 7 of the drawings. These spindles 126, 127 are provided with collars 128, 129, respectively, preventing any displacement thereof. Each of these spindles is provided with a driving pulley 130, 131, respectively, at its outer extremity and is adapted to carry a milling cutter 132 at its inner extremity. A belt 133 may be used to drive the pulley 130 and spindle 126 and a belt 134 may be used to drive the pulley 131 and spindle 127. To provide for the opposite rotation of these spindles 126, 127, I have shown the belt 134 crossed, it being assumed that the belts 133, 134 are driven from a common driving shaft. The rod 135 is journaled in the rib 15³ and held in place thereby by the collar 136, as shown in Fig. 7. This rod 135 is threaded at its inner portion to threadedly engage the boss 122 of the pedestal 120. On the opposite end of said rod 135 outside the rib 15³ is secured the gear 137. Outside of the gear 137 an operating crank 138 is secured to the end of said rod. On the other side of the base of said machine a rod 140 is journaled in the rib 16³ and threadedly engages the depending bosses 123 of the pedestal 121. This rod 140 is prevented from displacement with respect to the rib 16³ by a collar 141. Secured to the outer extremity of the rod 140 is the gear 144. These rods 140, 135 are located on a common axis. Located below the rods 135, 140 and parallel therewith is a long rod 150. This rod 150 is journaled in a pair of bracket members 151, one being secured to the inner side of the wall 15² and the other to the inner side of the wall 16² of the brackets 15 and 16, respectively. This rod 150 also passes through and is journaled in said inner walls 15² and 16², respectively, and the side walls 11 of the base. A gear 152 is located at one extremity of the rod 150 and meshes with the gear 144. Adjacent the other extremity of the rod 150 is carried a gear 153 meshing with the gear 137. A worm wheel 154 is carried at the extremity of the rod 150 exteriorly of the gear 153. It will be noted that upon rotation of the crank 138, the rod 135 will operate to either withdraw or slide forward the pedestal 120 while motion will be communicated to the rod 140 through the gears 137, 153, rod 150, gears 152, 144, whereby the pedestal 121 will be simultaneously moved toward or away from the pedestal 120. Therefore, it will be seen that the pedestals 120 121 carrying the spindles 126 and 127, respectively, may be simultaneously moved toward each other or away from each other laterally with respect to the carrier member 30.

A short shaft 160 is journaled in a bearing 161 carried on the table 17, as seen in Fig. 5 of the drawings. At one extremity of this shaft is secured a collar 162 to prevent removal of the rod 160. At the other extremity of this shaft 160 is the bevel gear 163 in mesh with a second bevel gear 164 with the shaft 165 located in the same plane as shaft 160 and at right angles thereto. This shaft 165 is journaled in the bracket bearing 166 secured to the side of the table 17 by means of bolts or the like 167 passing through its wall 168, as shown in Fig. 3 of the drawings. Collars 169 prevent displacement of the rod 165 of said bearing 166.

Mounted upon one side wall 15′ of the bracket 15 is the bracket bearing 170. The rod 165 is journaled and slidably mounted in this bearing 170. A sprocket wheel 171 is carried on the rod 165 exteriorly of the bearing 170, as shown in Fig. 3. This sprocket 171 is rotated by the rod 165, but is also capable of slidable movement thereon by means of a feather or spline, not shown, sliding in the keyway of the rod 165. A bracket 175 projects from the outer portion of and is secured to the inner face of a side wall 15′ of the bracket 15, as shown in Fig. 3. This bracket 175 carries a bifurcated bearing 176 in which are pivotally journaled trunnions 177 formed on the bearing 178. Journaled in this bearing is a shaft 180 carrying the worm 181 intermediate its extremities. The worm 181 meshes with the worm wheel 154. At one extremity of the rod 180 in a plane with the sprocket wheel 171 is a second sprocket 182. This sprocket 182 is driven from the sprocket 171 by means of the chain 183. At the opposite extremity of the rod 180 a handle 185 is mounted in such a manner as to permit the rod 180 to rotate freely therein.

Pivotally secured in the handle 185 is a grip 186 pivoted to the handle at 187 and normally kept out of contact therewith by the spring 188. Pivotally secured to this grip 186 is a detent 189 adapted to engage notches 190 in a quadrant bracket 191, see Fig. 3. By pressing the grip 186 into contact with the handle 185 the detent 189 will be drawn out of engagement with either of the notches 190 when by means of the handle 185 the rod 180 may be lifted or lowered about the pivotal mounting of the bearing 178 in the bifurcated bearing 176. By this means the worm 181 may be kept in or out of engagement with the worm wheel 154. A chain 193 transmits power from the sprocket 51 to the sprocket 194 secured to the shaft 160. When the machine is in operation in the position shown in Fig. 3 it will be seen that power is transmitted from the sprocket 51 to the sprocket 194, through the bevel gears 163 and 164, through the sprockets 171 and 182 to the worm 181. The worm 181 will then rotate the worm wheel 154 which will rotate the rod 150. The gears 152 and 153 will then simultaneously impart motion to the gears 144 and 137, respectively, whereby, as will be obvious, the pedestals 121 and 120 carrying the spindles 127, 126, respectively, will be advanced slowly toward each other. When it is desired to throw the mechanical feeding movement of the pedestals and spindles out of engagement it is merely necessary to compress 186 and raise the rod 180 until the detent 189 engages the upper notch 190 when the mechanical feeding will be stopped and the crank 138 may be used to withdraw the milling cutter.

In the operation of the complete machine, when for example it is desired to simultaneously mill internal threads on a short pipe coupling, as shown in Fig. 7, the threaded bolts 36 are withdrawn sufficiently to permit the insertion of the coupling 38 in the position shown in Fig. 7. The bolts 36 are then tightened to permit the clamping members 35 to securely grip and hold the coupling 38. The table 17 is then moved laterally with respect to the pedestals 120 and 121 by means of the crank 105 and rod 101 until the center of the carrier coincides approximately with the common axis of the spindles 126 and 127. These spindles are advanced until the cutters are in the position desired with respect to the coupling 38 by means of the crank 138 and the train of gears and rods, etc., operated thereby. The carrier may then be moved laterally with respect to the spindles until the cutters are in contact with the coupling 38. If a further adjustment of the spindles 126 and 127 is necessary to bring the cutters 132 into exact cutting position it may be made at this point. If the driving means has not been in operation hitherto it may be started at this point, thereby causing the carrier members 30 to rotate through the medium of engagement of the worm 41 with the worm rack 40, the worm 41 being driven by means of the shaft 45 and the train of gearing described above. The power may also be applied to the spindles 126 and 127 at this point if it has not been done previously, causing the milling cutters 132 to rotate in the desired direction according to the direction of the thread to be cut on the pipe coupling 38. The spindles being now in their initial cutting position and the cutters being in contact with the material, the eccentric handle 100 is slowly rotated to a position approximately at 180° from the position shown in Fig. 3 of the drawings. By means of the collars 104 secured to the rod 101 the movement of the block 94 caused by the rotation of the eccentric 96, as explained above will cause the rod 101 to be moved bodily outward and will cause the table 17 to be moved a corresponding distance. This will also move the carrier member 30 and the coupling 38 a distance equal to twice the eccentricity of the eccentric 96. This eccentric is preferably chosen with an eccentricity slightly more than half the depth of the thread to be cut on the coupling 38 so that as the eccentric handle 100 is slowly rotated the cutters will gradually be fed into the coupling 38 to a depth equal to the depth of the thread desired to be cut when the eccentric handle 100 may be released. This engagement of the stud 95 of the block 94 with the eccentric 96 will prevent reversed movement of the rod 101 until the crank 105 is rotated. It will thus be seen that by means of the eccentric 96 and its allied parts I have provided an accurate means for feeding the milling cutters laterally into the work and locking the cutters in their final position before starting the feeding movement of the cutters longitudinally of said work.

Previous to the operation of the eccentric handle 100 and eccentric 96 the rod 150 is lowered into the position shown in Fig. 3 when the worm 181 will mesh with and rotate the worm wheel 154 as described above. The reduction of the speed imparted to the rod 150 thereby and hence to the pedestals 120 and 121 is such as to feed these pedestals 120 and 121 toward each other so as to each advance with respect to the coupling 38 a distance equal to the pitch of the thread to be cut. As this automatic feeding of milling cutters takes place the operation of the eccentric as described above is performed so that as the first series of threads are cut they will not reach their full depth. The carrier member is preferably driven so as to rotate once as the spindles and pedestals are each advanced a distance equal to the pitch of the thread. It will be seen that owing to the time required in the operation of the eccentric operating means 96 the first series of threads will not attain the full depth so that at least one revolution of the carrier is required after the eccentric has been rotated to its final position.

While I have described the operation of this machine when used for simultaneously cutting internal threads at each end of a pipe coupling, it is to be noted that external threads may be as readily cut on short pipe sections, or the machine may be used to cut a single set of threads on one end of pipe or other material by removing one pedestal from the machine. Furthermore, the gears, worms, sprockets, etc., used in the operation of this machine may be varied to obtain any desired relative speed of the parts.

It is to be noted that to secure the smoothest threads the spindles 126, 127 are preferably carried by the pedestals 120, 121, respectively, in such a manner that the axis of each milling cutter will lie in a plane perpendicular to the threads being milled, rather than to the cross section of the pipe or other material being milled.

While I have shown my invention as embodied in a specific form, I do not wish to limit myself thereto beyond the scope of the appended claims.

I claim:

1. In a device of the class described, a carrying member adapted to carry short sections of pipe or other material, a plurality of spindles, milling cutters carried thereby and adapted to mill threads on the ends of said pipe sections, means to continuously rotate said cutters and means to move the same longitudinally of said carrying member, and means to feed said carrying member transversely of said cutters and spindles.

2. In a device of the class described, a work carrying and clamping member, means to rotate said member, spindles carrying milling cutters at their inner ends adjacent said work carrying member, means to move said carrying member laterally with respect to said milling cutters, and means cooperating with said last named means to move said carrying member a predetermined distance laterally with respect to said spindles.

3. In a device of the class described, a work carrying and clamping member, means to rotate said member, spindles carrying milling cutters at their inner ends adjacent said work carrying member, means to move said carrying member laterally with respect to said milling cutters, and means coacting with said last named means to move said carrying means laterally with respect to said spindles a distance approximately equal to the depth of thread to be cut on pipe or other material carried by said carrying member.

4. In a device of the class described, a supporting base, a table slidably mounted on said base, and a carrying member rotatably carried by said table, said carrying member being provided with an internal sleeve secured thereto, said sleeve being provided with clamping means.

5. In a device of the class described, a supporting base having an upper plane surface, a table slidably mounted on said surface, rollers journaled on said table, and a carrying and clamping member rotatably supported on said rollers.

6. In a device of the class described, a supporting base having an upper plane surface, a table slidably mounted on said surface, rollers journaled on said table, a carrying and clamping member rotatably supported on said rollers, and means to rotate said carrying and clamping member.

7. In a device of the class described, a supporting base having an upper plane surface, a table slidably mounted on said base, a cylindrical carrying member rotatably carried by said table, said carrying member being provided with a worm rack on its outer periphery, and means to rotate said carrying member, said means comprising a rotatable worm meshing with said worm rack.

8. In a device of the class described, a supporting base having an upper plane surface, a table slidably mounted on said base, a cylindrical carrying member rotatably carried by said table, said carrying member being provided with a worm rack on its outer periphery, means to rotate said carrying member, said means comprising a rotatable worm meshing with said worm rack, and means to drive said worm.

9. In a device of the class described, a supporting base having an upper plane surface, a table slidably mounted on said base, a cylindrical carrying member rotatably carried by said table, said carrying member being provided with a worm rack on its outer periphery, means to rotate said carrying member, said means comprising a rotatable worm meshing with said worm rack, means to drive said worm, and means to vary the speed of said driving means.

10. In a device of the class described, a table, rollers carried by and journaled in said table, and a carrying member rotatably mounted on said rollers.

11. In a device of the class described, a table, rollers carried by and journaled in said table, a carrying member rotatably mounted on said rollers, and means to adjust one of said rollers radially with respect to said carrying member.

12. In a device of the class described, a supporting base having an upper plane surface, a table slidably mounted on said plane surface, rollers carried by and journaled in said table, a carrying member rotatably mounted on said rollers, and means to adjust one of said rollers radially with respect to said carrying member.

13. In a device of the class described, a supporting base having a plane upper surface, a table slidably mounted on said plane surface, said table being provided with upwardly projecting journal flanges, a plurality of rollers journaled in said flanges, and a carrying member having a grooved outer periphery, said carrying member being rotatably mounted on said rollers, said rollers registering with the groove in the periphery of said carrying member.

14. In a device of the class described, a supporting base, a table slidably mounted on said base, two pairs of adjacent flanges upwardly projecting from said table, a roller journaled in each pair of said flanges, an inverted J-shaped member upwardly projecting from said table and overhanging the central portion thereof, a roller journaled in the extremity of said J-shaped member, said roller lying in the same plane as the first named rollers, said rollers having wedge-shaped peripheries, a carrying member rotatably mounted on and between said rollers, said rollers fitting in a groove in the outer periphery of said carrying member, and means to rotate said carrying member.

15. In a device of the class described, a supporting base, a table slidably mounted on said base, two pairs of adjacent flanges upwardly projecting from said table, a roller journaled in each pair of said flanges, an inverted J-shaped member upwardly projecting from said table and overhanging said central portion thereof, a roller journaled in the extremity of said J-shaped member, said roller lying in the same plane as the first named rollers, said rollers having wedge-shaped peripheries, a carrying member rotatably mounted on and between said rollers, said rollers fitting in a groove in the outer periphery of said carrying member, a worm rack secured around the periphery of said carrying member, and a rotatable worm engaging said worm rack, said worm being carried by a shaft journaled on said J-shaped member.

16. In a device of the class described, a supporting base, said supporting base being provided with an upper plane surface, a table slidably mounted on said plane surface, bracket members secured to the sides of said base and projecting upwardly therefrom, bearings carried on the upper surface of said brackets, and spindles journaled in said bearings, said bearings being movable on said brackets laterally with respect to said carrying member.

17. In a device of the class described, a supporting base, said supporting base being provided with an upper plane surface, a table slidably mounted on said plane surface, bracket members secured to the sides of said base and projecting upwardly therefrom, bearings carried on the upper surface of said brackets, spindles journaled in said bearings, said bearings being movable on said brackets laterally with respect to said carrying members, and means to manually move said bearings longitudinally.

18. In a device of the class described, a supporting base, said supporting base being provided with an upper plane surface, a table slidably mounted on said plane surface, bracket members secured to the sides of said base and projecting upwardly therefrom, bearings carried on the upper surface of said brackets, spindles journaled in said bearings, said bearings being movable on said brackets laterally with respect to said carrying member, means to manually move said bearings longitudinally, and means to automatically move said bearings and spindles longitudinally toward said carrying member.

19. In a device of the class described, a supporting base, said supporting base being provided with an upper plane surface, a table slidably mounted on said plane surface, bracket members secured to the sides of said base and surface of said brackets, spindles journaled in said bearings, said bearings being movable on said brackets laterally with respect to said carrying member, means to manually move said bearings longitudinally, and means to automatically move said bearings and spindles longitudinally toward said carrying member, said last named means being capable of being thrown into or out of operation at will.

20. In a device of the class described, a supporting base, a carrying member slidably mounted on said supporting base, brackets secured to the sides of said base and projecting upwardly therefrom, pedestal bearings mounted on said brackets and movable laterally with respect to said carrying member, shafts threadably engaging bosses depending from said pedestal bearings, each of said shafts having a gear wheel secured thereto outwardly of the extremities of said pedestal bearings, a counter-shaft located below said first named shafts, said counter-shaft carrying gears meshing with the gears carried by said first named shafts, a worm wheel carried at one end of said counter-shaft, and a worm carried by a shaft located at right angles to said counter-shaft, said worm meshing with said worm wheel, said worm shaft carrying a sprocket at its other extremity, said shaft being pivoted intermediate its extremities whereby it may be operated to throw the said worm into or out of engagement with said worm wheel.

21. In a device of the class described, a supporting base, a carrying member slidably mounted on said supporting base, brackets secured to the sides of said base and projecting upwardly therefrom, pedestal bearings mounted on said brackets and movable laterally with respect to said carrying member, shafts threadably engaging bosses depending from said pedestal bearings, each of said shafts having a gear wheel secured thereto outwardly of the extremities of said pedestal bearings, a counter-shaft located below said first named shafts, said counter-shaft carrying gears meshing with the gears carried by said first named shafts, a worm wheel carried at one end of said counter-shaft, a worm carried by a shaft located at right angles to said counter-shaft, said worm meshing with said worm wheel, said shaft being pivoted intermediate its extremities whereby it may be pivoted to throw the said worm into or out of engagement with said worm wheel, and means to drive said worm shaft.

In testimony whereof, I have subscribed my name.

CARL OTTO BERGMAN.

Witnesses:
HENRY A. PARKS,
EDYTHE M. ANDERSON.